United States Patent [19]

Gordon et al.

[11] 3,713,868

[45] Jan. 30, 1973

[54] ACRYLIC-NITRILE FOAM-BACKED FABRIC AND METHOD OF PREPARATION

[75] Inventors: Philip L. Gordon; Augustin La Torre, both of Cambridge, Mass.

[73] Assignee: General Latex and Chemical Corporation, Cambridge, Mass.

[22] Filed: Jan. 6, 1971

[21] Appl. No.: 104,479

Related U.S. Application Data

[63] Continuation-in-part of Ser. No. 72,819, Sept. 16, 1970, which is a continuation-in-part of Ser. No. 683,828, Nov. 17, 1967, abandoned.

[52] U.S. Cl. ............... 117/65.2, 117/8, 117/135.5, 117/161 UC, 117/161 LN, 117/161 UT, 117/163
[51] Int. Cl. ........................................... B44d 1/44
[58] Field of Search ........ 117/161 UC, 161 LN, 163, 65.2, 117/139.5 A, 135.5; 260/2.5 L, 2.5 N, 29.4 UA; 161/159

[56] References Cited

UNITED STATES PATENTS

| | | | |
|---|---|---|---|
| 3,215,647 | 11/1965 | Dunn | 260/2.5 L |
| 2,629,919 | 3/1953 | Golden | 161/159 |
| 3,028,279 | 4/1962 | Heberlein | 161/159 |
| 3,518,102 | 6/1970 | Mertgen et al. | 161/159 X |
| 3,231,533 | 1/1966 | Garrett et al. | 117/142 X |
| 3,255,139 | 6/1966 | Dinges et al. | 260/80.73 X |
| 3,104,231 | 9/1963 | Fitch | 260/80.73 X |

Primary Examiner—William D. Martin
Assistant Examiner—Theodore G. Davis
Attorney—Richard P. Crowley and Richard L. Stevens

[57] ABSTRACT

An acrylic foam-coated fabric which is breathable, opaque, has excellent insulation properties and is resistant to water and dry-cleaning solvents, but which is flexible and has good hand and drape properties. The fabric has a densified foam coating of a cured acrylic-nitrile copolymer which contains an opaque filler material. The coated fabric is prepared by coating a fabric with an air-froth latex cross-linkable acrylic-nitrile polymer composition, drying the foam coating to a semirigid state, calendering the semirigid foam coating to crush and densify the coating; and thereafter, curing the densified foam coating. The fabric finds particular use for drapery material and surface coverings, such as upholstery fabric and clothing like rainwear and inserts.

31 Claims, No Drawings

ACRYLIC-NITRILE FOAM-BACKED FABRIC AND METHOD OF PREPARATION

This application is a continuation-in-part application of U.S. Ser. No. 72,819, filed Sept. 16, 1970, which application is a continuation-in-part application of U.S. Ser. No. 683,828, filed Nov. 17, 1967 (now abandoned).

BACKGROUND OF THE INVENTION

Foams formed from foamable latex compositions have found increasing utility practicularly as coatings or laminated to fabrics to impart various properties thereto such as increased thermo-insulation, resistance to water and solvents, opacity, and acoustical insulation. Further, the properties of flexibility, color fastness to light, breathability and soft hand must also often be attainable. In the past, however, the preparation of foamable compositions to provide some of these properties often resulted in the loss of other properties.

Foamable acrylic resins, while providing good color fastness to light often failed to provide the desired wash and solvent resistance, and fabrics coated therewith were too stiff, i.e., had poor hand. Polyvinyl chloride plasticized resins generally have poor temperature resistance and the plasticizers may migrate into the fabric thus reducing flexibility and discoloring the fabric. Urethane compositions have poor resistance to sunlight. Natural and synthetic elastomers and their carboxylic derivatives are often not suitable because of their tendency to discolor upon use, due in part to the residual conjugated bonds in the elastomer.

In spite of their shortcomings, acrylic resins are desirable for forming foams, and particularly for coating drapery fabrics with foams because of the excellent low temperature resistance, lack of necessity for external plasticication and good color fastness on exposure to light. Particular acrylic resin compositions have been known and employed in coating fabrics. For example, in U.S. Pat. No. 3,290,023, issued Jan. 3, 1967, to A.J. Leaderman et al, a coated fabric is disclosed employing an acrylic resin polymerized in situ by the use of an acid catalyst, to obtain thermoinsulating properties by the use of specific ranges of filler material. However, such resins are not foamed and as the desire for increased thermoinsulating characteristics and the need for heavier coatings increase, the flexibility and hand of fabrics coated with such a solid coating rapidly diminishes. In addition, such coatings are not breathable and have limited usefulness where breathability is desired, such as in apparel lining and rainwear.

U.S. Pat. No. 2,868,752, issued Jan. 13, 1959 to Frasier et al discloses a particular acrylic composition which employs a specific anionic emulsifier. Such a composition is deficient in forming an acceptable foam structure. U.S. Pat. No. 3,215,647, issued Nov. 2, 1965 to E.R. Dunn discloses a particular copolymer which is subject to the aforementioned deficiencies of the elastomers. The above patents are incorporated by reference herein in their entirety.

Accordingly, it is one object of this invention to provide a foamable latex composition, which when foamed and coated on a support such as a fabric provides a product which possesses a good hand, light fastness, abrasion resistance and can be dry cleaned.

An object of this invention is to provide a foam-coated sheet material, which material is coated with a foamed acrylic-nitrile copolymer.

Another object of this invention is to provide a method for preparing a densified foam-coated fabric, which coated fabric has excellent drape and hand properties.

A further object is to provide a densified acrylic-nitrile foam-coated fabric characterized by enhanced wash and dry-cleaning solvent resistance and improved thermal and acoustical insulating properties.

SUMMARY OF THE INVENTION

This invention relates to a foam-coated sheet material, particularly having a densified, cured, acrylic-nitrile copolymeric foam coating thereon to provide a product, such as drapery fabric, which is capable of being dry cleaned, substantially free from surface tack, breathable; i.e., in passing moisture vapor but not water, good color fastness to light exposure such as sunlight, opaque, yet of light weight with good thermal or acoustical insulating properties. One surprising feature of this invention is that the coated fabric often has better hand, drape and flexibility properties after densification and cross-linking or curing than before, while normally, such curing without densification would increase the stiffness of such fabric.

The improved water and solvent resistance and other properties of this coated fabric are obtained in part by the use of a foamable latex of an acrylic-nitrile copolymer which provides enhanced solvent resistance for organic solvents in particular, and which permits curing by the use of cross-linking resins, such as aminoaldehyde resins. The improved thermal and acoustical properties of the coated fabric together with control of opacity are obtained through the use of an essentially open-cell foam structure of the coating. The use of a foam coating permits many advantages without a substantial increase in coating weight, and therefore, it is also less expensive than employing a solid coating which would significantly reduce the breathability of the coated fabric. The combination of our acrylic-nitrile copolymer and the foam structure with the further step of densifying the foam so formed provides a coated fabric which is flexible and has soft-hand and good drape characteristics. Such coated fabrics have a surprising number of advantages over those coated fabrics employing other latex copolymers.

The novel foams of this invention are prepared by foaming the acrylic-nitrile latex copolymer composition by the introduction of a gas, such as air, and/or by mechanical beating. The foamed copolymer composition is then coated on a substrate, such as the surface of a sheet material; e.g., a fabric, and the coating is then dried, e.g., at a temperature of less than about 300°F; e.g., 240°–300°F, and for a time period insufficient to cure or cross-link significantly or substantially the acrylic-nitrile copolymer, but to dry the foam. In this manner, a dried rigid or semirigid thin foam coating is obtained on the fabric, which coating is then subsequently densified; that is, increased in foam density, such as by passing the coated fabric through one or more calendering and/or embossing operations. For example, the coated fabric may be passed through a combination of calender and embossing rolls to reduce the foam thickness of the lightly cross-linked dried foam coating more than about 20 percent, for example, 40–80 percent, and to impart a particular embossed design on the surface thereof. The densified foamcoated fabric, after the densifying operation which crushes the individual cells in the foam body, has a softer hand than the fabric prior to such densification and enhanced breathability. Thereafter, or simultaneously with such densifying, the coated fabric is heated to a temperature, e.g., of greater than about 300°F, such as 300°–375°F, to cure or cross-link substantially the densified foam coating. Despite the post-curing operation after the calendering operation, the coated foam fabric exhibits excellent drape properties which is surprising that the post-curing operation did not significantly affect or stiffen the hand of the fabric. To obtain the fabrics of this invention, it is necessary to employ such sequential and separate operations; that is, drying and curing, with an intermediate operation of densifying by embossing or calendering.

The present invention employs a foamable latex composition composed of an aqueous emulsion of a copolymer having as essential components: a) a lower alkyl acrylate; b) a nitrile; c) an unsaturated carboxylic acid; d) an amine; and e) an aryl polyether alcohol surfactant.

The surfactant employed is an aryl polyether alcohol, preferably an alkylaryl polyether alcohol such as alkylphenoxypolyethoxy ethanol, more preferably the octylphenoxypolyethoxyethanols and nonylphenoxypolyethoxyethanols. In a particularly preferred embodiment, the surfactant is an octylphenoxypolyethoxyethanol, i.e., one prepared by the reaction of t-octylphenol with ethylene oxide, having a molecular weight of about 2,000. These surface-active agents are nonionic in type and are known to the art. For example, they are commercially available under the tradename "Triton" (Rohm & Haas Company, Philadelphia, Pa.).

As examples of suitable acrylates which may be employed, mention may be made of $C_1$–$C_6$ acrylates, e.g., methyl, ethyl, isopropyl, butyl and 2-ethylhexyl acrylates. Preferably, ethyl acrylate is employed.

Typical nitrile monomers include acrylonitrile as well as alkyl-substituted acrylonitriles such as methacrylonitrile.

The unsaturated carboxylic acids include acrylic acid, methacrylic acid, itaconic acid, fumaric acid, maleic acid and the like.

The amides suitable for use in the present invention include acrylamides and methylolacrylamides and their substituted derivatives, such as alkylaryl amides and alkyl methylolacrylamides, such as diacetone acrylamide.

It has been found that the combination of the aforementioned monomers and the specific surface-active agent provides a foam with properties unatainable in prior art compositions. These advantageous properties are evident throughout the entire process involved in the preparation of the foam structure.

It is desirable that foams should meet the following criteria during the various stages of preparation.

A. Precure or wet foam stage.
 1. Small but uniform bubble structure.
 2. Good rolling bank.
B. Setting and drying stage.
 1. No surface cracks.
 2. No breakdown in bubble structure.
 3. No foam collapse.
 4. Even surface.
C. Crushing and curing stage.
 1. Good cell wall tack to get uniform crusing under pressure rolls.
 2. No surface cracks.

Table I illustrates the range and components of the copolymer as well as preferred components and the preferred range.

TABLE I

Acrylic-Nitrile Copolymer

| Ingredients | Parts by weight Range | Preferred range |
|---|---|---|
| Acrylate monomer (ethyl acrylate) | 50–100 | 75–85 |
| Nitrile monomer (acrylonitrile) | 5–20 | 10–15 |
| Unsaturated carboxylic monomer (acrylic acid) | 0.5–5.0 | 1–2 |
| Amide (methylol acrylamide) | 0.5–5.0 | 1–3 |

The surfactant is employed at a level of 1 to 10 percent by weight, based on the weight of the monomers, preferably 3.5 to 4.5 percent by weight is employed.

The foamable acrylic copolymer composition is prepared by a method of incremental addition wherein a small amount of the surface active agent and water is employed to prepare a preemulsion of the entire monomeric mixture. About 10 percent of the preemulsion is then introduced into a reactor into which is also added a redox catalyst system comprising, for example, an inorganic persulfate as the oxidizing agent and a bisulfite or a meta bisulfite as a reducing agent. Once the polymerization reaction has been initiated, separate oxidizing and reducing agent streams as well as the remaining portion of the emulsion are introduced into the reactor with the temperature maintained at about 130° to 150°F. until the polymerization is completed.

The polymerization catalyst may be activated by an organic or inorganic acid, preferably an organic acid such as mono, di, tri, or other polycarboxylic acid containing an unsaturated group.

The solids of the latex may vary over a relatively wide range, preferably, the latices are 50 percent solids.

The following nonlimiting examples illustrate the representative composition of the present invention prepared by the above-described procedure. The compositions also include iron sulfate (trace), ammonium persulfate (0.138 parts by weight), sodium metabisulfite (0.182 parts by weight) and deionized water (96.12 parts by weight), and optionally may include particulate filler material, e.g., 100 – 300 parts per 100 parts of the copolymer.

Example 1

| | Parts by Weight |
|---|---|
| Ethyl acrylate | 80.16 |
| Acrylonitrile | 10.46 |
| Methacrylic acid | 0.92 |
| Itaconic acid | 0.28 |
| Methylolacrylamide (60%) | 3.12 |
| Octylphenoxypolyethoxyethanol surfactant | 3.5% based on weight of monomers |

Example 2

| | Parts by weight |
|---|---|
| Ethyl acrylate | 50 |
| Butyl acrylate | 50 |
| Acrylonitrile | 10 |
| Acrylic Acid | 1.5 |
| Methylolacrylamide | 2 |
| Octylphenoxypolyethoxyethanol Surfactant | 4.5% based on weight of |

Example 3

| | Parts by weight |
|---|---|
| Butyl acrylate | 60 |
| Acrylonitrile | 15 |
| Acrylic Acid | 2 |
| Methylolacrylamide | 1 |
| Nonylphenoxypolyethoxyethanol | 3.0% based on weight of monomers |

Example 4

| | Parts by weight |
|---|---|
| Ethyl acrylate | 50 |
| 2-ethylhexyl acrylate | 45 |
| Acrylonitrile | 12 |
| Methacrylic acid | 1.5 |
| Methylolacrylamide | 2 |
| Nonylphenoxypolyethoxyethanol | 6% based on weight of monomers |

Example 5

| | Parts by weight |
|---|---|
| 2ethylhexyl acrylate | 80 |
| Acrylonitrile | 20 |
| Methacrylic acid | 3 |
| Acrylamide | 1 |
| Octylphenoxypolyethoxyethanol | 4.5% based on weight of monomers |

Example 6

| | Parts by weight |
|---|---|
| Ethyl acrylate | 50 |
| Butyl acrylate | 25 |
| 2-ethylhexyl acrylate | 25 |
| Acrylonitrile | 15 |
| Acrylic acid | 1 |
| Acrylamide | 4 |
| Octylphenoxypolyethoxyethanol | 7% based on weight of monomers |

The following table illustrates the effect of foam characteristics by various surfactants. An x indicates satisfactory characteristics. In all cases the copolymer composition of Example 1 was used with the specified surfactant.

Table II

| | Alkyl-aryl sulfate | Alkylaryl polyester sulfate | Alkyl Sulfate | Alkyl phenoxy polyether ethanol (TritonX405) |
|---|---|---|---|---|
| A. Pre Cure Stage | | | | |
| Small but uniform cell structure | — | — | x | x |
| Good rolling bank | — | x | — | x |
| B. Setting and Drying Stages | | | | |
| No surface cracks | — | x | x | x |
| No foam collapse | x | — | x | x |
| Uniform cells | x | — | x | x |
| C. Crushing and curing stages | | | | |
| Good cell wall tack to get uniform crushing under pressure rolls | — | — | — | x |
| No surface cracks | — | x | — | x |
| Good water and dry cleaning resistance | x | x | x | x |

The foregoing table shows that by employing the specific surfactant in the specific copolymer latex, the overall superior properties can be achieved in the foam system throughout the entire handling process. Even employing the same monomer system, the alkyl sulfates, for example, did not impart the desired characteristics in the crushing and curing stages whereas the alkylaryl sulfates did not form a satisfactory cell structure. Other latices containing surfactants, such as the phosphate ester of the ethylene oxide adduct of nonylphenol, the ethylene oxide adducts of long-chain aliphatic alcohols, the ethylene oxide adducts of fatty acidsubstituted polyhydric alcohol or amine polyglycol condensates, contained such a quantity of coagulum, in some cases, over 25 percent coagulum, that they could not even be evaluated. A latex prepared with an ethylene oxide adduct of propoxylated glycol could not be satisfactorily compounded to prepare a suitable foam.

Of course, the above formulation may also contain additional conventional ingredients in varying amounts. Typical water-soluble thickeners to adjust to formulations to the proper viscosity include cellulose ethers, e.g., carboxymethyl cellulose, natural or synthetic water-soluble gums, polyvinyl pyrrolidone or the like. Pigments such as titanium dioxide and zinc sulphide are employed. Plasticizers, particularly non-migrating plasticizers, may also be employed at the discretion of the operator.

Typical mineral fillers include talc, clay, diatomaceous earth, calcium carbonate, silica and the like, which mineral fillers are employed to impart the desired opacity and for economic reasons. Typical buffering agents used include alkaline agents, salts like diammonium acid phosphate, trisodium polyphosphate and the like. Various antitack agents, such as wax emulsions like a paraffin wax; colloidal silica and the like may be used. Since the latex must be foamable, the addition of antifoam agents such as silicones should be avoided.

In a preferred embodiment, materials such as the aminoaldehyde resins which are cross-linking agents and which coreact with the acrylic copolymers are added in small amounts. The materials include those coreactive materials set forth in U.S. Pat. No. 3,215,647. Particularly preferred coreactive resin materials include melamine, melamine-formaldehyde condensates, urea-formaldehyde condensates, butylated melamine-formaldehyde condensates, and the like.

A foamable latex formulation useful for the preparation of a cured, cross-linked, crushed, foam-backed drapery fabric is illustrated in Table II:

TABLE III

Typical Foamable Latex Formulation

| Ingredients | Parts by Weight Range | Parts by Weight Example |
|---|---|---|
| Acrylic-nitrile copolymer (copolymer of ethyl acrylate-acrylonitrile-acrylic acid-acrylamide as in Table I) | 100 | 100 |
| Amino-aldehyde resin (melamine resin American Cyanamide CRYEZ No. 933 | 5–25 | 10–25 |
| Water | 50–300 | 150–250 |
| Mineral filler (clay) | 40–200 | 50–100 |
| Pigment (titanium dioxide) | 5–25 | 10–15 |
| Dispersing agent | 0.1–5.0 | 1–2 |
| Ammonia 26°Be | 1–5 | 2–3 |
| Buffering agent | 0.1–5.0 | 1–2 |
| Detackifier surface finishing (ammonium stearate) | 0.5–10.0 | 3–5 |
| Surface-active agent - $C_{8-9}$ alkylphenylpolyethoxy- | | |

| | | |
|---|---|---|
| ethanol | 0.5–5.0 | 1–3 |
| Water-soluble thickener | 0.05–3.0 | 0.1–0.5 |

Of course, the above formulation may also contain additional ingredients as desired in small amounts.

Typical dispersing or wetting agents may be employed in small amounts where desired after the preparation of the latex with the surfactant, such as ionic, nonionic or anionic agents such as fatty acid soaps or a fatty acid condensation product with an alkylene oxide, for example, the condensation product of ethylene oxide with lauryl or oleic acid or an ester of fatty alcohols and the like.

To avoid the problems associated with the past practices, a cross-linkable foamable acrylic-nitrile latex formulation should be employed. Our acrylic-nitrile latex includes an alkyl acrylate to provide soft hand to the fabric, an unsaturated nitrile, such as acrylonitrile, to provide improved and upgraded solvent resistance, a cross-linking agent such as a nitrogen-containing reactant material containing methylol groups like methylol acrylamide or a fusible amino-aldehyde resin, and an unsaturated carboxylic acid. The alkyl acrylates may be substituted with small amounts of, for example, up to about 10 percent with alkyl methacrylates. However, in general, methacrylates increase the hardness of the coated fabric. Increased amount of nitrile also should be avoided for similar reasons, while in addition, increased nitrile content often tends to lead to discoloration problems.

The foamable latex compositions of the present invention are employed for coating substrates, such as fabrics, films, etc., with foams. The latex copolymer composition is foamed and then coated on the surface. The coating is then dried at a temperature of less than 300°F., e.g., 165°–270°F, and for a time period insufficient to significantly or substantially cure or cross-link the acrylic-nitrile copolymer, but to dry the foam. In this manner, a dried, rigid or semirigid, thin foam coating is obtained on the fabric, which coating is then subsequently densified; that is, increased in foam density, such as by passing the coated fabric through one or more calendering or embossing operations. For example, a coated substrate, such as a fabric, is passed between pressure rolls at 100–150 psi to crush or densify. The foam thickness of the lightly cross-linked dried foam coating is reduced more than about 20 percent, for example, 40–80 percent. Thereafter, or simultaneously with such densifying, the coated fabric is heated to a temperature of greater than about 300°F, for example, 300°–375°F, to cure or substantially cross-link the densified foam coating. Despite the post-curing operation after the calendering operation, the coated foam fabric still has excellent drape properties which is surprising, since one would expect the post-curing operation to stiffen the hand of the fabric. To obtain the fabrics having the desired properties, it is preferable to employ such sequential and separate operations; that is, drying and curing, with an intermediate operation of densifying by embossing or calendering.

The material to be coated may, for example, be any sheet material or fabric, such as a woven, nonwoven or knitted fabric of natural or synthetic fibers or mixtures thereof, such as woven open-weave cotton material and bleached muslin or silk or wool or synthetic fibers, such as vinyl chlorides, polyethylene, polypropylene, polyesters, vicose, polyamides, and acrylics as well as paper, fiber glass, canvas, felt, films, foils, and the like. As an example of a suitable fabric, mention may be made of a tufted rug. If desired a suitable tie coat or barrier coat known to the art is employed.

The wet foam coated onto the surface of the fabric generally has a foam density ranging from about 7 to 30 lbs./cu. ft., while the dry foam has a foam density ranging from about 4 to 18 lbs./cu. ft., and, after calendering, a foam density of 12 to 54 lbs./cu. ft.. The foam may be coated onto substantially all or only a designated portion of the fabric. The thickness of the foam coating may vary, depending upon the use of the finished product and may range, for example, from 1 mil. to 10 mil. with a resistance to washing and dry cleaning and insulation properties.

In the process as described, the latex formulation does not pass through a wet gelling stage in the first drying operation, but rather, the wet foam, upon the removal of water, forms a stable, dry foam structure. After the densification operation, the dry densified foam coating is characterized by an internal foam structure of crushed cells which imparts enhanced breathability and flexibility characteristics to the finished foam-coated fabric and an open-cell continuous surface layer. In the cross-linking operation, after calendering, very high temperatures of over 425°F should be avoided; otherwise, mud cracking of the foam occurs.

It has been found that our stable emulsions of our copolymer are prepared in the presence of a nonionic surfactant as the sole or substantially the sole surfactant, and that such surfactant should possess a proper hydrophobic-hydrophilic balance. In the preparation of our foamable latex compositions, small amounts generally less than 5 percent of the total weight of the surfactant of other ionic surfactants or compounds acting as surfactants can typically be tolerated, but larger amounts usually greater than 2 to 10 percent often cause a rapid diminution in the desirable qualities of the foamable latex composition. For example, the introduction of anionic surfactants, such as the alkylaryl polyether sulfates, ethoxylated sodium solfoacid esters, such as an ethoxylated sodium sulfosuccinate as well as the esters or salts of fatty acids or alcohol sulfates such as sodium aryl sulfates during the preparation of the copolymeric emulsion, effects the shelf life and may induce coagulation as well as undesirable increases in viscosity. Some aqueous copolymeric emulsions where an alkylaryl polyether surfactant is employed as substantially the sole surfactant in the preparation of the emulsion copolymer where the surfactant contains a marginal hydrophobic-hydrophilic balance provides latex compositions of high viscosity, but on dilution, these latex compositions still provide acceptable foamable latex compositions for use in preparing foam-coated fabrics. After the preparation of our foamable latex compositions, the stability of the emulsion copolymer provided by our discovery then permits some additional quantities of a nonionic or cationic surfactant to be incorporated without severely diminishing acceptable foamability or stability properties of the composition.

The preferred surfactants employed in the preparation of our foamable latex composition are those alkylphenoxypolyethoxyethanols such as the octyl and nonyl alkyl derivatives which are commercially available, and wherein the number of ethoxy groups; that is, the mole ratio of the ethoxy groups in the molecule, ranges from approximately from 30 to 100, and more particularly, from about 40 to 70. Other alkylphenoxypolyalkoxyalkanols may be employed as desired providing they provide an equivalent hydrophobic-hydrophilic balance similar to those octylphenoxypolyethoxyethanols. Typical surfactants would include $C_6$—$C_{16}$ alkylphenoxy, $C_2$—$C_8$ alkoxy, $C_2$—$C_8$ alkanols prepared by the reaction of alkyl phenols with epoxide compounds such as propylene oxide, ethylene oxide, octylene oxide, butylene oxide, $C_{12}$—$C_{14}$ epoxides and other such epoxide-type compounds reactive with phenols to provide nonionic surfactants, the alkylphenoxypoly $C_2$—$C_3$ alkoxys $C_2$—$C_3$ alkanols, the preferred surfactants employed in preparing our stable emulsion copolymers. In general, the percent of the alkoxy groups in the alkylaryl polyether surfactants may range from about 85 to 95 percent by weight.

EXAMPLE 7

An aqueous emulsion of the copolymer, as of Example 1, was prepared, except that different surfactants were employed as set forth in 7A to 7O. After preparation, the stable aqueous copolymer was compounded with conventional fillers, pigments, foaming and lubricating agents to form a latex composition (part A) having a dry weight of 188 parts.

A foam was prepared by adding to part A, just prior to foaming, about 10 parts of a melamine-formaldehyde condensate resin and 10 parts of benzyl butyl phthalate and the resulting composition mixed in a laboratory mixer at high speed for about 2 minutes. When the foam reached the desired level, the mixer speed was reduced and the foam refined for about 1 minute and the cup height (3 ounces) determined. The cup height was 15 to 20 grams, otherwise additional whipping and refining was carried out.

The foam was knife-coated onto a cotton fabric at a thickness of about 35 mils and the coated fabric placed in an oven for 2 minutes at 300°F to gell the foam. The gelled foam was then crushed by placing an aluminum foil on top and running the fabric through a pair of rubber squeeze rolls. The crushed gelled foam was then cured in an oven for 3 minutes at 275°F.

A surfactant was employed in the preparation of the aqueous emulsion of the copolymer as follows with the weight of the surfactant employed kept constant:

| | | | |
|---|---|---|---|
| 7A | Triton X405 | t octyl phenoxy poly-ethoxyethanol | 40 ethoxy groups |
| 7B | Triton X305 | t octyl phenoxy poly-ethoxyethanol | 30 ethoxy groups |
| 7C | Igepal CO 977 | nonyl phenoxy poly-ethoxyethanol | 50 ethoxy groups |
| 7D | Triton X705 | t octyl phenoxy poly-ethoxyethanol | 70 ethoxy groups |
| *7E | 50% Triton X305 | | about 34 ethoxy groups |
| | 50% Triton X405 | | |
| *7F | 50% Triton X305 | | about 58 ethoxy groups |
| | 50% Triton X705 | | |
| *7G | 50% Triton X165 | | about 39 ethoxy groups |
| | 50% Triton X705 | | |
| 7H | Igepal CO 887 | nonylphenoxy poly-ethoxyethanol | 30 ethoxy groups |
| 7I | Igepal CO 897 | nonylphenoxy poly-ethoxyethanol | 40 ethoxy groups |
| 7J | 50% Igepal CO 897 | | about 29 ethoxy groups |
| | 50% Triton X165 | | |
| *7K | 98% Triton X405 | alkylaryl poly-ether sulfate | |
| | 2% Triton X202 | | |
| *7L | 98% Triton X405 | ethoxylated sodium sulfo succinate | |
| | 2% Aerosol A102 | | |
| 7M | 98% Triton X405 | sodium lauryl sulfate | |
| | 2% Sipex UB | | |
| 7N | 95% Triton X405 | | |
| | 5% Triton X202 | | |
| 7O | 95% Triton X405 | | |
| | 5% Sipex UB | | |

* solids basis
Triton is a trademark of Rohm & Haas Co.
Igepal is a trademark of GAF Corporation
Sipex is a trademark of American Alcolac
Aerosol is a trademark of American Cyanamid The latex compositions 7O and 7N coagulated in 2 and 7 days respectively, while 7B increased in viscosity on dilution and provided a poor quality foam. Examples 7C and 7G also became thick on dilution, but provided a good quality foam, and all others produced acceptable foam and and crushed foam fabrics.

The results indicate that the octyl and nonylphenoxypolyethoxyethanols having from about 30 to 70 moles of ethoxy groups or molecules in the absence of anionic surfactants, 2 percent or less of the surfactant weight provided an acceptable foamable acrylic latex composition.

Our invention has been illustrated by the examples set forth, which examples are not to be restrictive of the scope of the invention.

What is claimed is:

1. A method of preparing a foamcoated sheet material, which method comprises:
   a. foaming an aqueous latex emulsion containing:
      i. a copolymer comprising from about 50 to 100 parts by weight of a lower alkyl acrylate; about 5 to 20 parts by weight of a nitrile selected from the group consisting of acrylonitrile and methacrylonitrile; about 0.5 to 5.0 parts by weight of a monomeric unsaturated carboxylic acid; and about 0.5 to 5.0 parts per weight of an acrylamide;
      ii. a cross-linking amount of a coreactive methylol amino compound; and
      iii. from about 0.1 to 10 percent by weight based on the weight of the monomers of a nonionic alkylphenoxypolyalkoxyalkanol surfactant containing from about 30 to 70 ethoxy groups;
   b. coating a thin layer of the foam latex onto one surface of a sheet material, the foam layer characterized by small but uniform bubble structure;
   c. drying the foam layer for a time insufficient to cross-link substantially the copolymer, said drying carried out without a breakdown in the bubble structure or collapse of the foam layer to provide a dry compressible foam layer; and d. cross-linking and curing the copolymer by heating the dried foam coating, thereby providing a sheet material having a cured and cross-linked thin foam coating thereon.

2. The method of claim 1 wherein the thin foam coating is dried at a temperature of approximately 165°–270°F.

3. The method of claim 1 which includes densifying the dried foam layer prior to cross-linking by reducing the foam thickness of the dry foam coating about 20 to 80 percent.

4. The method of claim 3 wherein the foam coated onto the surface of the material has a foam density ranging from about 7 to 30 lbs. per cubic foot and after densifying, a foam density of about 12 to 54 lbs. per cubic foot.

5. The method of claim 1 wherein the nonionic surfactant is an alkylphenoxypolyethoxyethanol containing from about 30 to 70 ethoxy groups.

6. The method of claim 1 wherein the nonionic surfactant is substantially the sole surfactant of the composition.

7. The method of claim 1 wherein the foamable latex composition comprises: an aqueous emulsion of a copolymer consisting essentially of from about 75 to 85 parts by weight of a lower alkyl acrylate; about 10 to 15 parts by weight of a nitrile selected from the group consisting of acrylonitrile and methacrylonitrile; about 0.5 to 5.0 parts by weight of a monomeric unsaturated carboxylic acid selected from the group consisting of acrylic acid, methacrylic acid, itaconic acid, fumaric acid and maleic acid; about 0.5 to 5.0 parts per weight of an amide selected from the group consisting of acrylamide and methylolacrylamide; and from about 5.0 to 25.0 parts of a melamine cross-linking resin; and from about 0.1 to 10 percent by weight based on the weight of the monomers of an alkylphenoxypolyethoxyethanol nonionic surfactant containing from about 30 to 70 ethoxy groups.

8. The method of claim 1 which includes cross-linking the copolymer by heating to a temperature of about 300° to 375°F to cross-link and cure the copolymer.

9. A method of preparing a crushed foamcoated sheet material, which method comprises:

a. foaming an aqueous latex emulsion of a copolymer comprising from about 50 to 100 parts by weight of a lower alkyl acrylate; about 5 to 20 parts by weight of a nitrile selected from the group consisting of acrylonitrile and methacrylonitrile; about 0.5 to 5.0 parts by weight of a monomeric unsaturated carboxylic acid; about 0.5 to 5.0 parts per weight of an acrylamide; a cross-linking amount of an amino-aldehyde resin; and from about 0.1 to 10 percent by weight based on the weight of the monomers of an alkylaryl polyether alcohol nonionic surfactant containing from 30 to 100 ethoxy groups;

b. coating a thin layer of the foam latex onto one surface of a sheet material, the foam layer characterized by small but uniform bubble structure;

c. drying the foam layer at a temperature of less than about 300°F and for a time insufficient to cross-link substantially the copolymer, but sufficient to dry the thin foam coating, said drying carried out without a breakdown in the bubble structure or collapse of the foam layer to provide a dry compressible foam layer;

d. densifying the thin dried foam coating on the sheet material by the application of pressure to reduce the thickness of the foam coating; and e. heating the densified foam coating to a temperature to cross-link and cure the copolymer, thereby providing a sheet material having a cured, densified thin foam coating thereon.

10. The method of claim 9 wherein the thin foam coating is dried at a temperature of approximately 165°–270°F.

11. The method of claim 9 wherein densification of the dried foam layer is accomplished by passing the sheet material containing the dried foam layer between pressure rolls wherein the foam thickness of the lightly cross-linked dry foam coating is reduced about 20 to 80 percent.

12. The method of claim 9 wherein the foam coated onto the surface of the material has a foam density ranging from about 7 to 30 lbs. per cubic foot and after densification, a foam density of about 12 to 54 lbs. per cubic foot.

13. The method of claim 9 wherein the densification and curing steps are carried out substantially simultaneously.

14. The method of claim 9 wherein the nonionic surfactant is an alkylphenoxypolyethoxyethanol containing from about 30 to 100 ethoxy groups.

15. The method of claim 9 wherein the nonionic surfactant is substantially the sole surfactant of the composition.

16. The method of claim 9 wherein the foamable latex composition comprises: an aqueous emulsion of a copolymer consisting essentially of from about 75 to 85 parts by weight of a lower alkyl acrylate; about 10 to 15 parts by weight of a nitrile selected from the group consisting of acrylonitrile and methacrylonitrile; about 0.5 to 5.0 parts by weight of a monomeric unsaturated carboxylic acid selected from the group consisting of acrylic acid, methacrylic acid, itaconic acid, fumaric acid and maleic acid; about 0.5 to 5.0 parts per weight of an amide selected from the group consisting of acrylamide and methylolacrylamide; about 5 to 25 parts of a melamine-formaldehyde cross-linking resin; and from about 0.1 to 10 percent by weight based on the weight of the monomers of an alkylphenoxypolyethoxyethanol nonionic surfactant containing from about 30 to 70 ethoxy groups.

17. The method of claim 9 wherein the densified foam coating is heated to a temperature of about 300 to 375°F to cross-link and cure the copolymer.

18. A method of preparing a foamcoated material characterized by enhanced resistance to dry-cleaning solvents and permeability to moisture vapor, which method comprises:

a. coating a thin layer of a foamed latex composition onto a fabric, the composition comprising:

i. a cross-linkable copolymer of a lower alkyl acrylate, a monomeric carboxylic acid, an acrylamide, and an acrylonitrile;

ii. an inert filler material; and iii. an amino-aldehyde resin in an amount of about 5 to 25 parts of resin per 100 parts of copolymer to coreact with the copolymer, and an alkyl aryl polyether alcohol nonionic surfactant containing from about 30 to 70 ethoxy groups.

19. The method of claim 18 wherein the composition contains a copolymer of 50 to 100 parts of an alkyl acrylate, 5 to 20 parts of an acrylonitrile, 0.5 to 5.0 parts of a monomeric unsaturated carboxylic acid, and 0.5 to 5.0 parts of an acrylamide.

20. The method of claim 18 wherein the densified foam coating is cross-linked at a temperature of from about 300° to 375°F.

21. The method of claim 18 wherein densifying reduces the foam coating thickness of about 20 to 80 percent.

22. The method of claim 18 wherein the aminoaldehyde resin is a melamine or urea-formaldehyde resin in an amount of from about 5 to 25 parts of resin per 100 parts of the copolymer.

23. The method of claim 18 wherein the latex emulsion contains from about 0.5 to 10.0 parts by weight of ammonium stearate.

24. The method of claim 18 wherein the latex emulsion contains from about 40 to 200 parts by weight of mineral fillers to impart opacity to the sheet material.

25. The method of claim 18 wherein the lower acrylate is ethyl acrylate, butyl acrylate or 2-ethylhexyl acrylate and combinations thereof; the acrylonitrile is acrylonitrile or methacrylonitrile; the carboxylic acid is acrylic acid, methacrylic acid, itaconic acid, fumaric acid and maleic acid and combinations thereof; and the acrylamide is acrylamide or methylol acrylamide.

26. The method of claim 18 wherein the nonionic surfactant is a $C_8$—$C_9$ alkylphenoxypolyethoxyethanol, which surfactant is substantially the sole surfactant of the composition.

27. A foam-coated sheet material containing on one surface thereof a dried cross-linked copolymeric foam layer, the foam layer characterized by a generally open-cell uniform bubble structure, the copolymer cross-linked only in an amount sufficient to provide a stable compressible foam layer, the copolymer comprising from about 50 to 100 parts by weight of a lower alkyl acrylate; about 5 to 20 parts by weight of a nitrile selected from the group consisting of acrylonitrile and methacrylonitrile; about 0.5 to 5.0 parts by weight of a monomeric unsaturated carboxylic acid; about 0.5 to 5.0 parts per weight of an acrylamide; a cross-linking amount of an amino-aldehyde resin; and from about 0.1 to 10% by weight based on the weight of the monomers of a nonionic alkylphenoxypolyalkoxyalkanol surfactant containing from about 30 to 70 ethoxy groups.

28. The foam-coated sheet material of claim 27 wherein the sheet material is a woven fabric, and wherein the foam layer has a density of about 7 to 30 pounds per cubic foot.

29. The foam-coated sheet material of claim 27 wherein the copolymer is a cross-linked and cured copolymer and the foam layer is characterized by a densified and crushed open-cellular structure, which fabric is suitable for use as a drapery fabric.

30. The material of claim 29 wherein the aminoaldehyde resin is a melamine or urea-formaldehyde resin in an amount of from about 5 to 25 parts of resin per 100 parts of the copolymer.

31. The material of claim 29 wherein the layer includes from about 0.5 to 10.0 parts by weight of ammonium stearate and from about 40 to 200 parts by weight of mineral fillers.

* * * * *

UNITED STATES PATENT OFFICE
CERTIFICATE OF CORRECTION

Patent No. 3,713,868            Dated January 30, 1973

Inventor(s) Philip L. Gordon and Augustin LaTorre

It is certified that error appears in the above-identified patent and that said Letters Patent are hereby corrected as shown below:

In column 13, claim 18, after part "iii", line 5, the following steps should be added:

(b) drying the foam-coated layer at a temperature of less than 300°F to obtain a dry compressible foam coating;

(c) densifying the dried foam coating by the application of pressure to reduce the thickness of the foam coating; and (d) heating and densified foam coating to a temperature of 300 to 425°F to cross-link the copolymer and the resin.

Signed and sealed this 3rd day of July 1973.

(SEAL)
Attest:

EDWARD M. FLETCHER, JR.
Attesting Officer

Rene Tegtmeyer
Acting Commissioner of Patents